United States Patent [19]

D'Amato et al.

[11] Patent Number: 4,900,111
[45] Date of Patent: Feb. 13, 1990

[54] EMBOSSED HOLOGRAMS FORMED ON HARD METAL SURFACES

[75] Inventors: Salvatore F. D'Amato, Floral Park; Edward H. Weitzen, Lawrence, both of N.Y.

[73] Assignee: American Bank Note Holographics, Inc., Elmsford, N.Y.

[21] Appl. No.: 312,068

[22] Filed: Feb. 15, 1989

[51] Int. Cl.⁴ .............................................. G03H 1/18
[52] U.S. Cl. .................................... 350/3.85; 350/3.6; 29/DIG. 37; 101/32
[58] Field of Search ............................... 350/3.6, 3.85; 29/DIG. 37; 101/32

[56] References Cited

U.S. PATENT DOCUMENTS 4,725,111 2/1988 Weitzen et al. .

OTHER PUBLICATIONS

Metals Handbook, 8th Edition, vol. 1, "Properties and Selection of Metals", pp. 617–618.
Metals Handbook, 8th Edition, vol. 2, "Heat Treating, Cleaning and Finishing", pp. 4–56 to 4–57.
Tool and Manufacturing Engineers Handbook, 4th Edition, vol. II, "Forming", pp. 1142–1143.
Metals Handbook, Ninth Edition, vol. 2: Properties and Selection: Nonferrous Alloys and Pure Metals, p. 475.

Primary Examiner—Bruce Y. Arnold
Assistant Examiner—Jay P. Ryan
Attorney, Agent, or Firm—Majestic, Parsons, Siebert & Hsue

[57] ABSTRACT

Embossed holograms or diffraction patterns are formed on hard, unembossible metal substrates such as steel sheet metal. The hard metal substrate has a soft embossible metal layer such as tin formed on it, and holograms are embossed thereon by means of a surface relief, metal master. The soft metal layer must be sufficiently thick to accommodate the deepest surface relief pattern. For tinplate, the embossing can be preformed at room temperature. Among other things, the process produces tinplates and tin cans with embossed holograms.

14 Claims, 1 Drawing Sheet

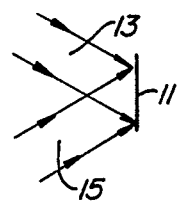
FIG._1.
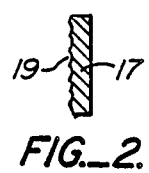
FIG._2.
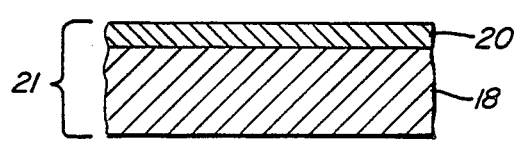
FIG._3.
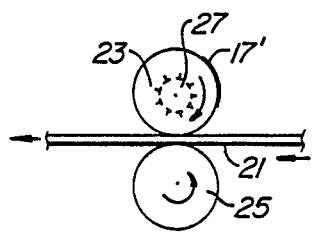
FIG._4.
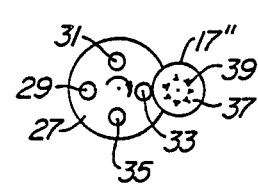
FIG._5.
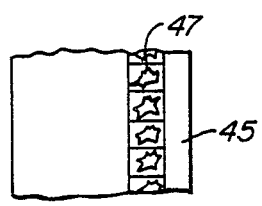
FIG._6.
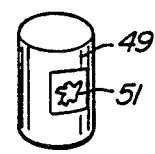
FIG._7.

EMBOSSED HOLOGRAMS FORMED ON HARD METAL SURFACES

BACKGROUND OF THE INVENTION

This invention relates generally to implementation of holography, and more specifically to the replication of holograms by embossing.

Mass replicated holograms are commonplace, appearing on credit cards, consumer packaging, and the like. They typically serve as security devices as well as decorations. The holograms allow viewing of images formed in reflective light at locations other than the hologram surface. This can be in the form of a three-dimensional image of an object or of a complex image having different planes.

Such holograms are made by interfering two beams of coherent light at a finite angle with each other on a photosensitive medium. One of the beams interacts with an object whose image is to be recorded, and the other is a reference beam. An image of the object is focused into or near the surface of the resulting hologram by appropriate optical elements, which may include use of another, intermediate hologram. The resulting master hologram is made to be of surface relief type; that is, the image information is stored in surface variations.

The fragile photographic hologram master is then used to make a rigid embossing master plate in order to emboss replicas. Such a rigid master is formed in an electrolytic bath on the surface of the photographic master. Multiple masters are then made from this first master, for use in embossing holograms on substrate material. The metal masters are generally made of nickel.

The most common substrate materials into which holograms are embossed by such masters include Mylar, a polyester, or similar sheet plastic material. Usually, such material has been coated with a thin layer of reflective material, such as aluminum, in order to result in a reflective hologram. The aluminum is usually vacuum deposited onto the substrate in a thickness merely sufficient to provide reflective properties to the substrate.

The embossing process involves heating the aluminized substrate to a temperature at which it becomes plastic, and then the nickel master plate is forced against the substrate to imprint the surface relief pattern in it. The embossing is usually done through the aluminum coating, but it is the substrate itself that, upon cooling, holds the surface relief pattern. The aluminum layer follows the surface relief pattern and thus is capable of reconstructing the original holographically recorded image in reflected light.

In actual use, these replicated holograms are usually subsequently attached to another surface, such as that of a credit card blank. Such attachment is made by use of an ordinary adhesive or by use of hot stamping techniques.

However, the practice of affixing hologram decals onto other articles may not be most desirable for decorative or security considerations. Often it is more elegant and more convenient to emboss the hologram directly onto the material forming the article. Also, a hologram formed directly on the material to be authenticated makes a better security device.

With metallic materials, the relative hardness makes embossing very difficult if not impossible. Nevertheless, U.S. Pat. No. 4,725,111, assigned to the same assignee of the present application, discloses a method of embossing hologram directly onto aluminum sheet or can. This is possible because above certain elevated temperatures, the hardness of aluminum is reduced to much below that of the nickel master.

It is a primary object of the present invention to develop techniques for embossing holograms onto a broader range of substrates.

It is another object of the present invention to develop techniques for forming holograms on substrates with hardness even comparable to or much greater than that of the metal master.

SUMMARY OF THE INVENTION

This and additional objects are accomplished by the various aspects of the present invention. The surface of a first metal substrate too hard for direct embossing first has a thin layer of a second metal formed thereon. The second metal layer may be formed by any number of chemical or physical processes such as plating, coating, sputtering, and laminating. A metal master hologram is used to emboss a surface relief pattern directly onto the outside surface of the second metal, thereby producing a reflection hologram directly thereon. The second metal is selected to be significantly softer than the metal master, and the thickness of the coating is sufficient to accommodate the deepest surface relief. An example is embossing on tin-plated steel sheets which may be used for manufacturing into articles or for panel display. Another example is the embossing of holograms on tin cans such as those sold in grocery stores for use in food storage. Both of these are examples of currently useful articles having holograms embossed directly on their surfaces in order to provide decoration or display information or authentication, all without having to first replicate the hologram in sheet plastic material that must be subsequently attached to such articles in a separate step.

A hologram is treated herein as a particular type of diffraction grating. The same techniques as summarized above also apply to the embossing of a diffraction pattern that does not carry a holographically recorded image. Such a diffraction pattern may be used in certain applications where it is desired to develop a decorative color spread of reflected light without reconstructing an image. In either case, the surface relief pattern that is embossed onto the metal surface is very fine since it was typically formed by the interference of two beams of light. It is the fineness of the surface relief pattern that makes embossing difficult compared with the common embossing of much coarser patterns on metals.

Additional advantages and features of the various aspects of the present invention will become apparent from the following description of its preferred embodiments, which description should be taken in conjunction with the accompanying drawings.

BRIEF DESCRIPTION OF THE DRAWINGS

FIG. 1 illustrates the construction of a hologram or diffraction element by interfering light beams;

FIG. 2 shows a portion of a surface relief metal embossing master;

FIG. 3 is a cross-sectional view of a hard metallic substrate with a layer of softer metal formed thereon, according to the present invention;

FIG. 4 illustrates generally the embossing of tin-plated or other metal sheets according to the present invention;

FIG. 5 illustrates generally the embossing of tin or other metal cans according to the present invention;

FIG. 6 illustrates a completed embossed tinplated sheet; and

FIG. 7 illustrates a finished embossed tin can product.

DESCRIPTION OF THE PREFERRED EMBODIMENTS

Referring initially to FIG. 1, a standard technique is illustrated for making a hologram or other form of diffraction pattern. A photosensitive medium (detector) 11 is simultaneously illuminated with mutually coherent beams 13 and 15 that intersect the detector 11 at a finite angle with each other. The result is an interference pattern that is recorded by the detector 11. If one of the beams 13 and 15 carries information of an object and the other beam does not, the interference pattern recorded on the photodetector 11 is a hologram capable of reconstructing an image of the object.

In standard techniques of mass replicating holograms and diffraction patterns, a metal master is formed from the recorded photodetector 11. An example section 17 of such a metal embossment plate is illustrated in FIG. 2. A surface relief pattern 19 is formed in at least one surface of the metal master 17. This surface relief pattern is a recording of the interference pattern formed at the photodetector 11 in FIG. 1. The surface relief pattern is formed, according to one known technique, by electrolytic deposition of nickel on a photographic surface relief master, such as that made by the technique of FIG. 1. The surface relief pattern 19 is capable of diffracting light incident on it to reconstruct an image, in the case of a hologram, or to diffract the incident light into its various colors, in the case of a diffraction pattern.

As shown in U.S. Pat. No. 4,725,111, such a standard embossing master plate 17 can be used to emboss the pattern onto a surface of aluminum sheet. This is possible only when the temperature is raised to over 150° C. such that the hardness of aluminum is substantially less than that of the metal master.

The present invention allows embossed pattern to be formed on even much harder metal substrate—metal so hard that, irrespective of temperature, its surface cannot practically be embossed directly. The invention calls for forming a second metal layer on the surface of the hard metal substrate. The second metal is selected to have a hardness (or yield strength) significantly less than that of the metal master. FIG. 3 illustrates a cross-sectional view of a compound sheet 21 comprising a first hard metal substrate layer 18 and a second softer metal layer 20.

One example of the compound sheet 21 is the common and useful tinplate—steel sheet metal plated with tin to prevent corrosion. In this case, the steel sheet metal corresponds to substrate layer 18 and one of the plated layers of tin corresponds to softer metal layer 20. Tinplate is widely used to fabricate cans, food containers and other consumer items.

It has been found that holograms can easily be embossed on the surface of tin even at room temperature, owing to its relative softness. One measure of hardness or softness of material for embossing is the yield strength (y.s.) of the material. It is a measure of the pressure required to produce a permanent deformation of a certain amount, usually 0.2% of its thickness. It is a well known, commonly used characteristic by which materials are specified. The yield strength of tin is relatively low, being about 1–2 ksi within the temperature range between 0° C. and 200° C., and increasing only to about 5 ksi at −200° C. In comparison, aluminum has a yield strength about one order of magnitude higher at room temperature and only approaches that of tin at temperatures higher than 200° C. Also in comparison, nickel has a yield strength about two orders of magnitude higher than that of tin for temperatures below 1000° C.

Referring to FIG. 4, a standard embossing master plate is used to emboss the pattern onto a surface of continuous moving compound sheet material 21. An embossing master 17' is attached to a first rotating drum 23 so that the surface relief pattern of it contacts the top surface of the sheet material 21 as the drum 23 rotates. A second drum 25, under the sheet material 21, serves to compress the sheet material 21 between the two rollers in order that the surface relief pattern of the metal master 17' is forced against the sheet material 21 with enough pressure to transfer the surface relief pattern to the sheet material.

In order for a faithful surface relief pattern to be made on the embossed surface of softer metal layer 20, the layer must have a thickness sufficient to accommodate a maximum depth of the relief pattern on the metal master 17'. A typical maximum depth amounts to less than $3 \times 10^{-6}$ meter. The layer must therefore be at least as thick, although in practice, allowance must also be made for unevenness at the surface of the hard metal substrate 18. Commercial grade tinplates suitable for food containers typically have tin layer thickness of about $2 \times 10^{-5}$ to $1 \times 10^{-4}$ meter which is more than adequate.

The embossing can simply be done at room temperature. Optionally, as in U.S. Pat. No. 4,725,111, the disclosure of which is hereby incorporated by reference, the temperature of the compound sheet material 21 is increased by a heater 27, preferably contained within the roller 23. The roller 25 is preferably cooled (not shown) in order to prevent calendaring of the material.

After compound sheet material 21, such as tinplate sheets, have been embossed with holograms and optionally, have other labels printed thereon, they can be used to fabricate tin cans, containers and other items with the holograms on them.

FIG. 5 schematically illustrates the technique for embossing tin cans after they have been formed. As in U.S. Pat. No. 4,725,111, a wheel 27 contains a plurality of mandrels 29–35 held thereby and extending normally away from one surface of the wheel. Each of the mandrels is of a shape to hold a tin can on it. This type of structure is presently used for applying paint to a formed can. It may also be used to emboss a hologram or diffraction pattern onto the cans. A roller 37 can be positioned to contact each of the cans as the wheel 27 is rotated. A metal embossing plate 17" is carried by an outside surface of the wheel 37. The can is compressed between the mandrel 33 and the embossing plate 17", in the position shown in FIG. 5, to transfer the surface relief pattern onto an outside surface of the can. However, unlike aluminum cans, the embossing of tin cans is readily done at room temperature. Optionally, the embossing plate is heated by a heater 39 preferably carried within the wheel 37, in order to facilitate the embossing process. Each of the mandrels 29-35 is preferably cooled.

It has been found that in the case of tin, the yield strength remains relatively constant at about 2 ksi at room temperatures and decreasing steadily to about 0.6 ksi at 200° C. For simplicity, the embossing is preferably done at room temperatures. However, if elevated temperature control is convenient, the embossing may be facilitated by further reduction in yield strength. For example, at about 200° C., the yield strength is reduced about 3-fold relative to that at room temperature.

The embossing is also preferably performed with an optimum pressure range. That pressure is that which will permanently deform the material on the surface being embossed, but no more. In terms of standard material characteristics, the desired pressure is of a magnitude that is slightly beyond the yield point of the material. A higher pressure will produce little in the way of a better embossed product and has a disadvantage of reducing the life of the embossing master by increased wear and also may cause undesired calendaring of the sheet material.

Referring to FIG. 6, a short length 45 of tinplate sheet is illustrated after having a strip of multiple holograms 47 embossed in its surface. The tinplate sheet may be cut up, each containing a hologram, and used to fabricate containers, tin cans and other items. The embossed hologram add a decorative feature to an otherwise plain, utilitarian object. Similarly, a beverage can 49 is illustrated in FIG. 7 to have a hologram 51 embossed on its outside surface. The hologram 51 can simply contain a decorative image, or, alternatively, can contain a portion of the labeling information.

Although the various aspects of the present invention have been described with respect to its preferred embodiments, it will be understood that the invention is entitled to protection within the full scope of the appended claims.

It is claimed:

1. A method of forming an embossed hologram on a first metal surface having a first hardness from a metal master surface relief pattern having a second hardness comparable or significantly less than said first hardness comprising the steps of:
   forming a layer of a second metal on said first metal surface, said second metal having a thickness in excess of a maximum depth of said master surface relief pattern, and having hardness much less than that of metal master, and
   compressing said second metal layer with said first metal layer and said metal master sufficient to cause second layer outside surface to substantially conform to surface relief pattern.

2. The method according to claim 1 wherein the step of compressing said second metal layer is performed at a temperature range in which said second metal has a yield strength substantially less than that of said metal master.

3. The method according to claim 2 wherein the step of compressing said second metal layer is performed at room temperature.

4. The method according to claim 2 wherein the step of compressing said second metal layer is performed at a temperature between −50° C. and 200° C.

5. The method according to claim 1 wherein said second metal is tin.

6. The method according to claim 1 wherein said second metal is a tin alloy.

7. A method of forming an embossed diffraction pattern on a tin-plating portion of a metal comprising the steps of:
   forming a metal master surface relief pattern of the diffraction pattern;
   tin-plating at least one portion of the metal to a thickness sufficient to accommodate a maximum relief depth of said metal master;
   maintaining said tin-plating within a temperature range where said tin-plating has a yield strength substantially less than that of said metal master; and
   impressing said metal master surface relief pattern against said tin-plating portion to cause surface thereon to conform substantially to surface relief pattern.

8. The method according to claim 7 wherein said diffraction pattern is a hologram.

9. The method according to claim 7 wherein said temperature range is between −50° C. and 200° C.

10. The method according to claim 7 wherein said temperature range is substantially at room temperatures.

11. A method of forming an embossed diffraction pattern on a tin can comprising the steps of:
   forming a metal master surface relief pattern of the diffraction pattern;
   selecting a tin can having a tin coating of thickness sufficient to accommodate a maximum relief depth of said metal master;
   maintaining said tin coating within a temperature range where said tin coating has a yield strength substantially less than that of said metal master; and
   impressing said metal master surface relief pattern against said tin coating to cause surface thereon to conform substantially to surface relief pattern.

12. The method according to claim 11 wherein said diffraction pattern is a hologram.

13. The method according to claim 11 wherein said temperature range is between −50° C. and 200° C.

14. The method according to claim 11 wherein said temperature range is substantially at room temperatures.

* * * * *